(12) United States Patent
Hwang et al.

(10) Patent No.: US 9,784,978 B2
(45) Date of Patent: Oct. 10, 2017

(54) HEAD-MOUNTED DISPLAY

(71) Applicant: Coretronic Corporation, Hsin-Chu (TW)

(72) Inventors: Chwen-Tay Hwang, Hsin-Chu (TW); Chi-Wu Hsiao, Hsin-Chu (TW); Chun-Li Lu, Hsin-Chu (TW); Chih-Lung Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 102 days.

(21) Appl. No.: 15/046,066

(22) Filed: Feb. 17, 2016

(65) Prior Publication Data

US 2016/0357020 A1    Dec. 8, 2016

(30) Foreign Application Priority Data

Jun. 5, 2015    (TW) .............................. 104118285 A

(51) Int. Cl.
   *G09G 5/00*      (2006.01)
   *G02B 27/01*     (2006.01)

(52) U.S. Cl.
   CPC .... *G02B 27/0176* (2013.01); *G02B 2027/014* (2013.01); *G02B 2027/0154* (2013.01); *G02B 2027/0167* (2013.01)

(58) Field of Classification Search
   None
   See application file for complete search history.

(56) References Cited

U.S. PATENT DOCUMENTS 7,153,283 B1    12/2006 Triolo et al.
9,247,779 B1 *  2/2016 Aloumanis ............ G08G 1/137
9,445,639 B1 *  9/2016 Aloumanis ........... A42B 3/0453
2006/0038694 A1 *  2/2006 Naunheim ............. A42B 3/046
                                              340/665
2016/0227866 A1 *  8/2016 Tal ..................... H04N 5/23293

FOREIGN PATENT DOCUMENTS

| CN | 101119655 A | 2/2008 |
| CN | 103744184 A | 4/2014 |
| JP | 2010141453 A | 6/2010 |
| JP | 2013044830 A | 3/2013 |
| TW | 201323925 A | 6/2013 |

OTHER PUBLICATIONS

Japanese Office Action dated Sep. 20, 2016, as issued in corresponding Japan Patent Application No. 2016-000322 (2 pages).

* cited by examiner

*Primary Examiner* — Ifedayo Iluyomade
(74) *Attorney, Agent, or Firm* — Muncy, Geissler, Olds & Lowe, P.C.

(57) ABSTRACT

A head-mounted display includes a shell, a display generation unit, a processing unit, at least one pressure sensor, and a linkage mechanism. The display generation unit includes at least an optical engine and a mirror connected to the optical engine. The processing unit is electrically connected to the optical engine and the pressure sensor, and the pressure sensor detects an external force applied to the shell and outputs a pressure signal to the processing unit. The linkage mechanism is electrically connected to the processing unit and connected to the display generation unit. The processing unit actuates the linkage mechanism to cause the mirror of the display generation unit to move away from the user's face.

9 Claims, 5 Drawing Sheets

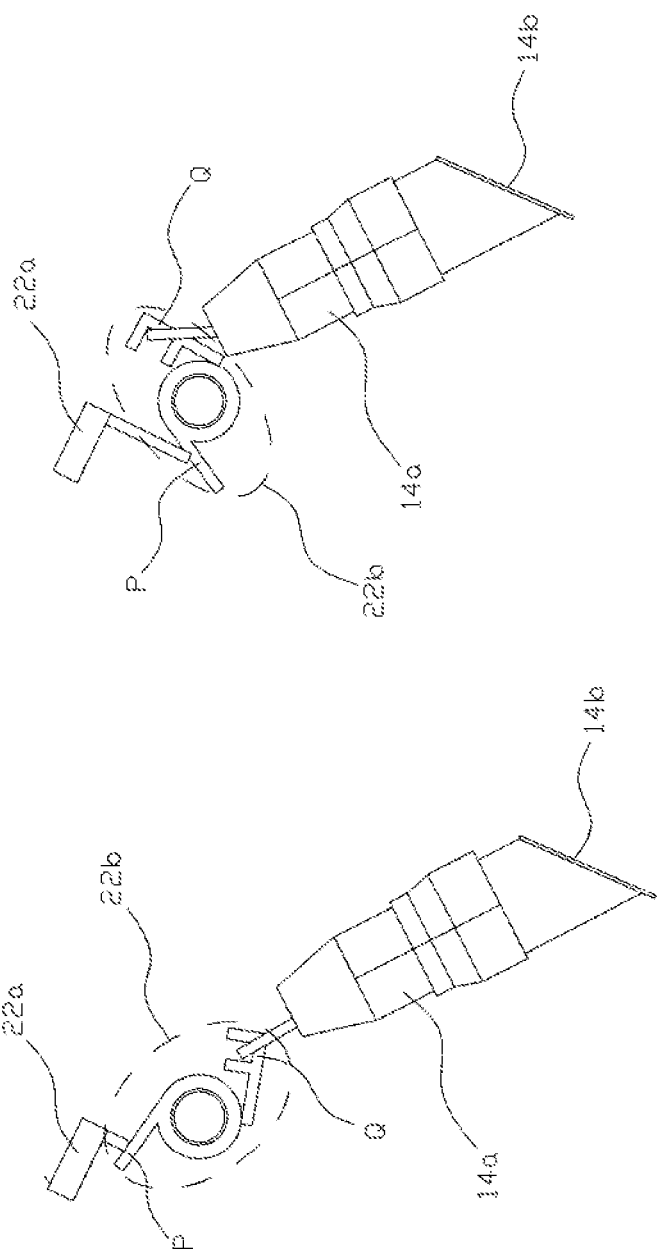

HEAD-MOUNTED DISPLAY

BACKGROUND OF THE INVENTION a. Field of the Invention

The invention relates generally to a head-mounted display, and more particularly, to a head-mounted display having a protection mechanism.

b. Description of the Related Art

Nowadays, a helmet with a head-mounted display is available on the market. However, optical components of such product for serving the display purpose are often exposed outside of and not received in the helmet. Therefore, in case an external force of the impact knocks the hamlet, the optical components are liable to crack or separate from the hamlet to injure the face or other part of a user wearing the helmet. Therefore, it is desirable to provide a head-mounted display that protects a user from injury as a result of the optical components under an external impact.

The information disclosed in this "BACKGROUND OF THE INVENTION" section is only for enhancement understanding of the background of the described technology, and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

BRIEF SUMMARY OF THE INVENTION

The invention provides a head-mounted display having a protection mechanism.

Other objects and advantages of the invention may be further illustrated by the technical features broadly embodied and described as follows.

In order to achieve one or a portion of or all of the objects or other objects, one embodiment of the invention provides a head-mounted display adapted to be worn by a user. The head-mounted display includes a shell, a display generation unit, a processing unit, at least one pressure sensor, and a linkage mechanism. The display generation unit is disposed in the shell and includes at least an optical engine and a mirror connected to the optical engine, and the optical engine projects at least one image on the mirror. The processing unit is disposed in the shell and electrically connected to the optical engine, the processing unit is configured to transmit at least one display signal to the optical engine, and the optical engine converts the display signal into the image. The pressure sensor is disposed in the shell and electrically connected to the processing unit, and the pressure sensor detects an external force applied to the shell and outputs a pressure signal to the processing unit. The linkage mechanism is electrically connected to the processing unit and connected to the display generation unit. When the external force exceeds a preset value, the processing unit actuates the linkage mechanism to cause the mirror of the display generation unit to move away from the user's face.

In one embodiment, the shell has a buffer region, and the optical engine and the processing unit are disposed in the buffer region. The linkage mechanism actuated by the processing unit may cause the mirror to move from a position near the user's eye to the buffer region.

In one embodiment, the linkage mechanism may include a pressing lever and a rotational hooked lever assembly. The pressing lever is electrically connected to the processing unit, and the rotational hooked lever assembly has a first end and a second end opposite the first end. The first end is connected to the pressing lever, and the second end is connected to the optical engine. The pressing lever is actuated by the processing unit to push the first end of the rotational hooked lever assembly, so that the second end of the rotational hooked lever assembly forces the optical engine to move and thus allows the mirror to move to the buffer region in the shell.

In one embodiment, the linkage mechanism may be detachably connected to the mirror, the mirror may be detachably connected to the optical engine, and the processing unit may actuate the linkage mechanism to detach the mirror from the linkage mechanism and the optical engine.

In one embodiment, the preset value for enabling the linkage mechanism may be equal to 300 G.

In one embodiment, the processing unit may include at least one control circuit board, and the pressure sensor is disposed on the control circuit board.

In one embodiment, the linkage mechanism may include a slide rail, and the linkage mechanism actuated by the processing unit causes the mirror of the display generation unit to move away from the user's face along the slide rail.

According to the above embodiments, when a detected external force, such as being formed as a result of the impact, exceeds a preset value, the processing unit may actuate the linkage mechanism to cause a component (such as a mirror) near a user's face or other part of body to move away from the user's face to protect the user. Besides, the component that may injure the user can be moved to a buffer region filled with a cushion material to further reduce the possibility of injury. Therefore, a protection mechanism according to the above embodiments may have a simplified structure, high response speed and improved protection effects.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 2A and FIG. 2B show enlarged schematic diagrams of a linkage mechanism according to an embodiment of the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
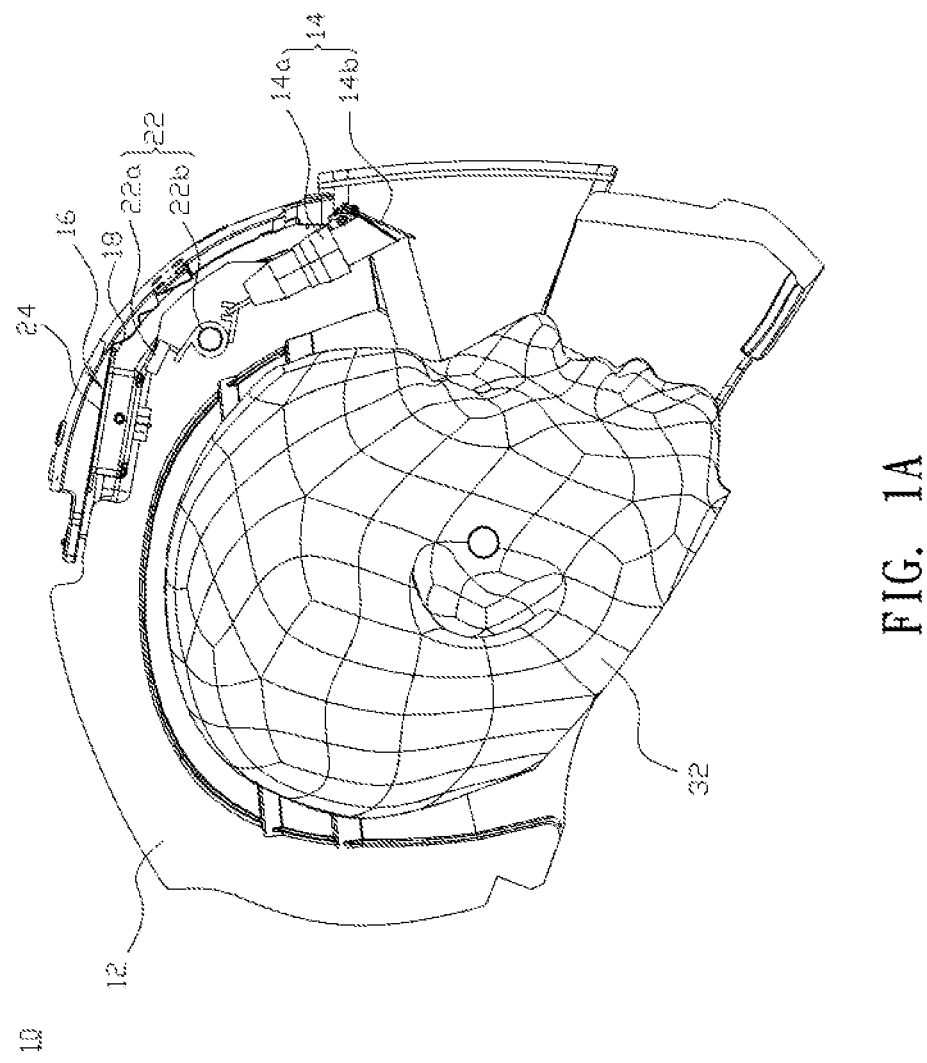
FIG. 1A and FIG. 1B show schematic cross-sections of a head-mounted display according to an embodiment of the invention.
Figure 1B:
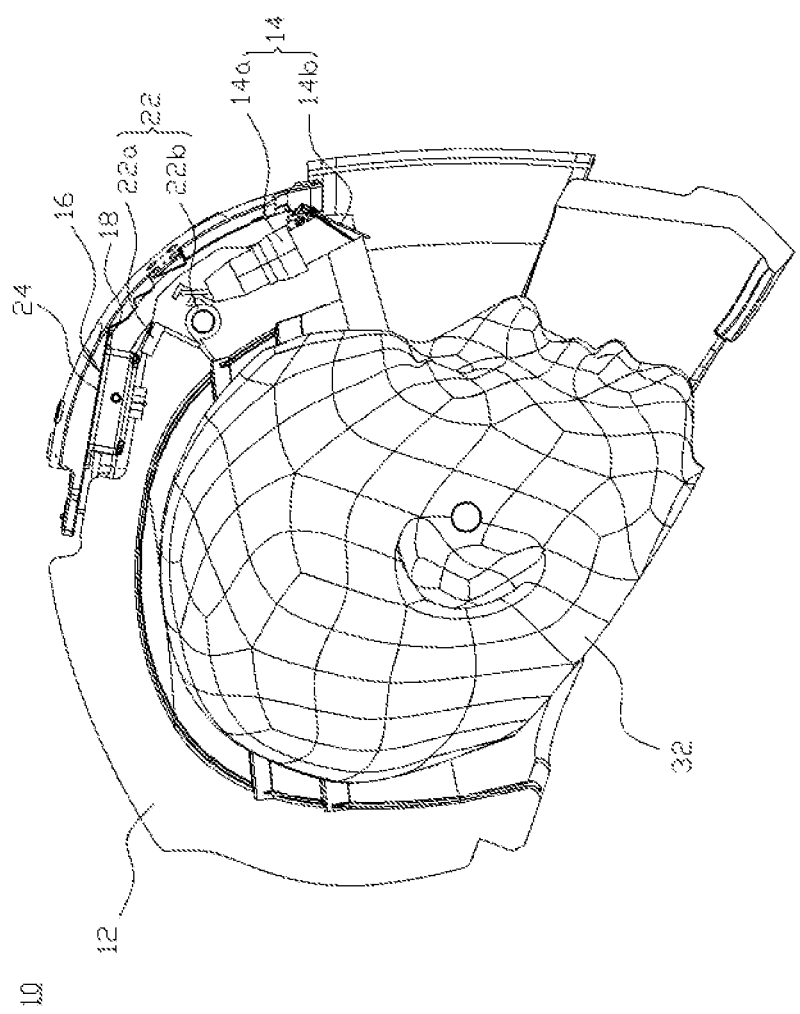

FIG. 1A and FIG. 1B show schematic cross-sections of a head-mounted display according to an embodiment of the invention, where FIG. 1A and FIG. 1B respectively show position relationships of components before and after the actuation of the protection mechanism. As illustrated in FIG. 1A and FIG.1B, a head-mounted display 10 adapted to be worn by a user may include a shell 12, a display generation unit 14, a processing unit 16, at least one pressure sensor 18, and a linkage mechanism 22. The display generation unit 14 is disposed in the shell 12 and includes at least an optical engine 14a and a mirror 14b connected to the optical engine 14a. The optical engine 14a is used to project at least one image on the mirror 14b. The mirror 14b may, for example, serve the function of an optical combiner. When a user 32 wears the head-mounted display 10, the user 32 may observe both the external environment and the image (enlarged virtual image) projected by the optical engine 14a on the mirror 14b. In one embodiment, the mirror 14b may be formed by applying a reflective coating on a transparent sheet to reflect image beams projected by the optical engine 14a and transmit ambient light. The processing unit 16 is disposed in the shell 12 and electrically connected to the optical engine 14a. The processing unit 16 is configured to transmit at least one display signal to the optical engine 14a, and the optical engine 14a converts the display signal into an image and projects the image on the mirror 14b. The pressure sensor 18 is disposed in the shell 12 and electrically connected to the processing unit 16. The pressure sensor 18 detects an external force applied to the shell 12 and output a pressure signal to the processing unit 16 in response to the detected external force. The linkage mechanism 22 is electrically connected to the processing unit 16 and connected to the display generation unit 14. When an external force, such as being formed as a result the impact, exerts on the shell 12, the pressure sensor 18 may detect the magnitude of the external force and output a pressure signal based on the force magnitude to the processing unit 16. In case the detected external force exceeds a preset value, the processing unit 16 may actuate the linkage mechanism 22 to move the display generation unit 14 to a security region. For example, the display generation unit 14 may be moved to allow the mirror 14b of the display generation unit 14 to be drawn away from the face of the user 32. Further, the preset value of the external force to enable the protection mechanism may vary according to actual demands. For example, helmet manufactures may determine the preset value according to actual design demands. In one embodiment, the preset value may be equal to 300 G. Further, in one embodiment, the processing unit 16 may include at least one control circuit board 24, and the pressure sensor 18 may be, but is not limited to, disposed on the control circuit board 24. Further, the head-mounted display 10 may include multiple pressure sensors 18, and the multiple pressure sensors 18 may be disposed on different positions of the shell 12 to enhance the detection sensitivity to external forces applied to the shell 12.

Figure 3:
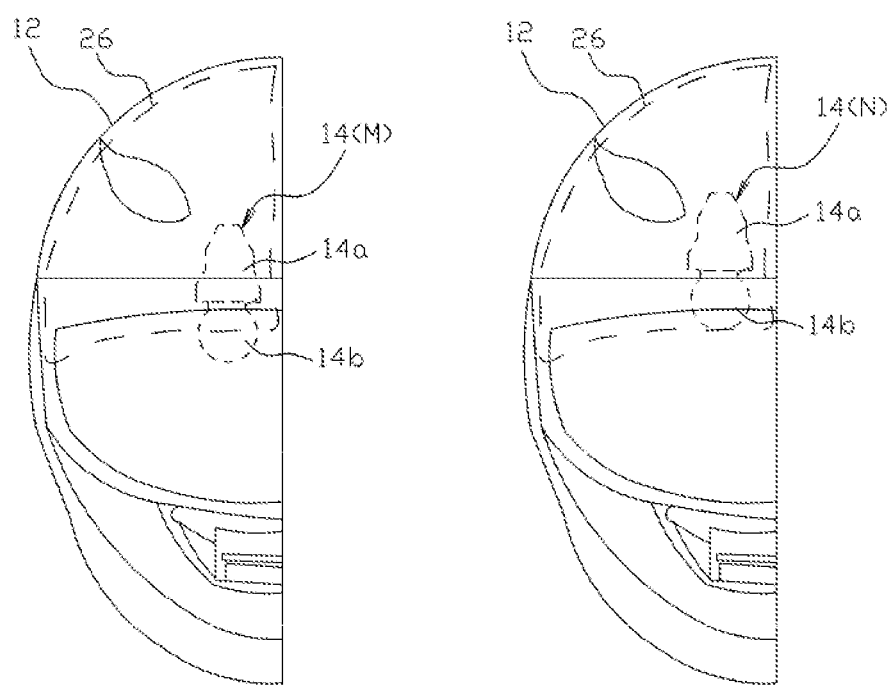
FIG. 3 shows a schematic diagram illustrating the effects of a protection mechanism in a head-mounted display according to an embodiment of the invention.

As illustrated in FIG. 2A and FIG. 2B, in one embodiment, the linkage mechanism 22 may include a pressing lever 22a and a rotational hooked lever assembly 22b. The pressing lever 22a may be electrically connected to the processing unit 16. The rotational hooked lever assembly 22b has a first end P and a second end Q opposite the first end P, the first end P is connected to the pressing lever 22a, and the second end Q is connected to the optical engine 14a. When an external force of the impact applied to the head-mounted display 10 exceeds a preset value, the linkage mechanism 22 of FIG. 2A is actuated to have a positional relationship of components shown in FIG. 2B. Specifically, in case the external force exceeds the preset value, the processing unit 16 may actuate the pressing lever 22a to allow the pressing lever 22a to push the first end P of the rotational hooked lever assembly 22b to rotate the rotational hooked lever assembly 22b, and thus the second end Q of the rotational hooked lever assembly 22b forces the optical engine 14a connected to the second end Q to move, so that the position of the mirror 14b in the shell 12 can be changed. FIG. 3 shows a schematic diagram exemplifying the effects of a protection mechanism in a head-mounted display 10. In case an external force exceeds a preset value, the linkage mechanism 22 may, for example, cause the display generation unit 14 to move upwardly (shifting from a position M to a position N) to leave the face of the user 32. In this embodiment, the shell 12 may be filled with a cushion material such as sponge, Styrofoam or foaming resin to form a buffer region 26 inside the shell 12, and the optical engine 14a and the processing unit 16 may be disposed in the buffer region 26 to be protected by the cushion material. Besides, in a normal condition where the linkage mechanism 22 is not enabled, the mirror 14b may be located outside the buffer region 26. Therefore, in case an impact force is applied to the head-mounted display 10 and the processing unit 16 actuates the linkage mechanism 22, the linkage mechanism 22 may cause the mirror 14b to move from a position such as near a user's eye to the buffer region filled with the cushion material. This may further reduce the possibility of injury to the user. Certainly, in this embodiment, the mirror 14b needs not to entirely enter the buffer region 26, and the possibility of injuring a user can be reduced even only a part of the mirror 14b is retracted to the buffer region 26.

Figure 4:
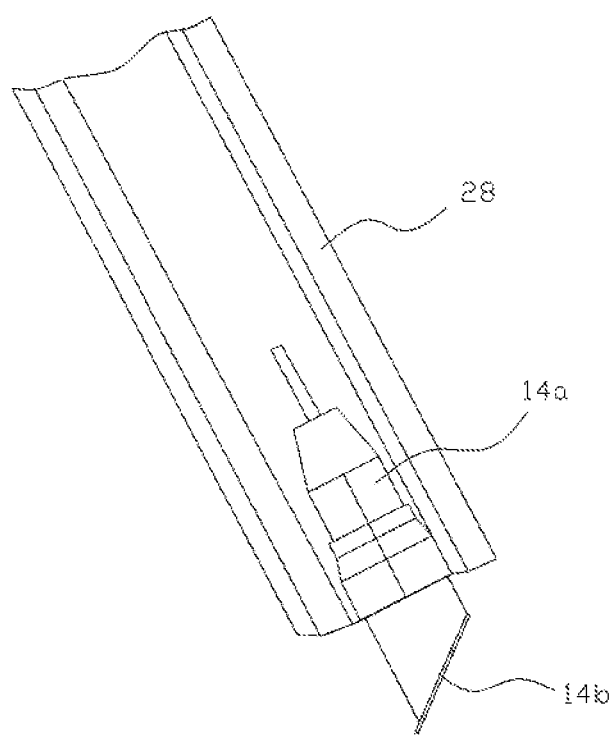
FIG. 4 shows a schematic diagram of a linkage mechanism according to another embodiment of the invention.

As illustrated in FIG. 4, in an alternate embodiment, the linkage mechanism 22 may further include a slide rail 28. When an impact force exceeds a preset value, the optical engine 14a of the display generation unit 14 may slide along the slide rail 28 by magnetic or drag forces to cause the mirror 14b to move away from a part of body (such as the face) of the user 32. Certainly, the design of the linkage mechanism 22 is not limited to a specific configuration. For example, the slide rail 28 may be used with the pressing lever 22a and the rotational hooked lever assembly 22b shown in FIG. 2A and FIG. 2B. In an alternate embodiment, the linkage mechanism 22 may be detachably connected to the mirror 14b, and the mirror 14b may be detachably connected to the optical engine 14a. Under the circumstance, when the processing unit 16 actuates the linkage mechanism 22, the mirror 14b may be detached from the linkage mechanism 22 and the optical engine 14a and may leave in a direction away from the user 32 to protect the user 32.

According to the above embodiments, when a detected external force, such as being formed as a result of the impact, exceeds a preset value, the processing unit may actuate the linkage mechanism to cause a component (such as a mirror) near a user's face or other part of body to move away from the user's face to protect the user. Besides, the component that may injure the user can be moved to a buffer region filled with a cushion material to further reduce the possibility of injury. Therefore, a protection mechanism according to the above embodiments may have a simplified structure, high response speed and improved protection effects.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure.

It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A head-mounted display adapted to be worn by a user, comprising:
    a shell;
    a display generation unit disposed in the shell and comprising at least an optical engine and a mirror connected to the optical engine, and the optical engine projecting at least one image on the mirror;
    a processing unit disposed in the shell and electrically connected to the optical engine, wherein the processing unit is configured to transmit at least one display signal to the optical engine, and the optical engine converts the display signal into the at least one image;
    at least one pressure sensor disposed in the shell and electrically connected to the processing unit, the pressure sensor detecting an external force applied to the shell and outputting a pressure signal to the processing unit; and
    a linkage mechanism electrically connected to the processing unit and connected to the display generation unit, wherein, when the external force exceeds a preset value, the processing unit actuates the linkage mechanism to cause the mirror of the display generation unit to move away from the user's face.

2. The head-mounted display as claimed in claim 1, wherein the shell has a buffer region, and the optical engine and the processing unit are disposed in the buffer region.

3. The head-mounted display as claimed in claim 2, wherein the linkage mechanism actuated by the processing unit causes the mirror to move from a position near the user's eye to the buffer region.

4. The head-mounted display as claimed in claim 3, wherein the linkage mechanism comprises:
    a pressing lever electrically connected to the processing unit; and
    a rotational hooked lever assembly having a first end and a second end opposite the first end, wherein the first end is connected to the pressing lever, and the second end is connected to the optical engine.

5. The head-mounted display as claimed in claim 4, wherein the pressing lever is actuated by the processing unit to push the first end of the rotational hooked lever assembly, so that the second end of the rotational hooked lever assembly forces the optical engine to move and thus allows the mirror to move to the buffer region in the shell.

6. The head-mounted display as claimed in claim 1, wherein the linkage mechanism is detachably connected to the mirror, the mirror is detachably connected to the optical engine, and the processing unit actuates the linkage mechanism to detach the mirror from the linkage mechanism and the optical engine.

7. The head-mounted display as claimed in claim 1, wherein the preset value is equal to 300 G.

8. The head-mounted display as claimed in claim 1, wherein the processing unit comprises at least one control circuit board, and the pressure sensor is disposed on the control circuit board.

9. The head-mounted display as claimed in claim 1, wherein the linkage mechanism comprises a slide rail, and the linkage mechanism actuated by the processing unit causes the mirror of the display generation unit to move away from the user's face along the slide rail.

* * * * *